US012258799B2

(12) United States Patent
Music

(10) Patent No.: US 12,258,799 B2
(45) Date of Patent: Mar. 25, 2025

(54) ASSEMBLY FOR GUIDING A MOVABLE FURNITURE PART

(71) Applicant: Julius Blum GmbH, Hoechst (AT)

(72) Inventor: Elvis Music, Lindau (DE)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/210,926

(22) Filed: Jun. 16, 2023

(65) Prior Publication Data

US 2023/0332447 A1 Oct. 19, 2023

Related U.S. Application Data

(63) Continuation of application No. PCT/AT2021/060476, filed on Dec. 14, 2021.

(30) Foreign Application Priority Data

Dec. 17, 2020 (AT) .............................. A 51104/2020

(51) Int. Cl.

| | |
|---|---|
| ***E05D 15/06*** | (2006.01) |
| ***E05D 15/26*** | (2006.01) |
| ***E05D 15/58*** | (2006.01) |
| ***E06B 3/50*** | (2006.01) |

(52) U.S. Cl.

CPC ....... *E05D 15/0621* (2013.01); *E05D 15/264* (2013.01); *E05D 15/58* (2013.01); *E06B 3/5045* (2013.01)

(58) Field of Classification Search

CPC ... E05D 15/58; E05D 15/0621; E05D 15/581; E05D 15/264; E05D 2015/586; E06B 3/5045; E05Y 2900/212

See application file for complete search history.

(56) References Cited

U.S. PATENT DOCUMENTS

| | | | | |
|---|---|---|---|---|
| 972,412 A * | 10/1910 | Taussig | E06B 3/5045 | 16/92 |
| 1,355,692 A * | 10/1920 | Reymann | E06B 3/5045 | 16/92 |
| 3,456,995 A * | 7/1969 | Nyquist | E06B 3/5045 | 312/331 |

(Continued)

FOREIGN PATENT DOCUMENTS

| | | |
|---|---|---|
| AT | 521139 | 11/2019 |
| BE | 708437 | 5/1968 |

(Continued)

OTHER PUBLICATIONS

International Search Report issued Feb. 24, 2022 in International (PCT) Application No. PCT/AT2021/060476.

*Primary Examiner* — Justin B Rephann

(74) *Attorney, Agent, or Firm* — Wenderoth, Lind & Ponack, L.L.P.

(57) ABSTRACT

An assembly for guiding a movable furniture part includes a guide system to be fastened to a stationary furniture part, and a support on which a movable furniture part can be pivotably mounted and which can be or is movably connected to the guide system in order to indirectly guide the movable furniture part on the stationary furniture part. The movable furniture part includes a guide device separate from the guide system, for directly guiding the movable furniture part on the stationary furniture part.

21 Claims, 9 Drawing Sheets

(56) References Cited

U.S. PATENT DOCUMENTS

| | | | | | |
|---|---|---|---|---|---|
| 4,348,069 | A * | 9/1982 | Lindsay | E06B 3/482 | 16/80 |
| 4,815,797 | A * | 3/1989 | Haab | E05D 15/58 | 49/257 |
| 4,821,375 | A * | 4/1989 | Kozon | E06B 3/5045 | 312/331 |
| 4,974,912 | A * | 12/1990 | Rask | E06B 3/5045 | 312/331 |
| 5,121,976 | A * | 6/1992 | Haab | E05D 15/58 | 49/254 |
| 5,131,449 | A | 7/1992 | Winn et al. | | |
| 5,149,180 | A * | 9/1992 | Haab | E05D 15/58 | 312/331 |
| 5,395,165 | A * | 3/1995 | Woerner | E05D 15/58 | 211/27 |
| 9,068,386 | B2 | 6/2015 | Ishii et al. | | |
| 9,894,996 | B1 * | 2/2018 | Grela | E05D 15/48 | |
| 10,227,806 | B2 * | 3/2019 | Gabl | E05F 1/16 | |
| 2004/0046488 | A1 * | 3/2004 | Hogan | E06B 3/5045 | 312/322 |
| 2004/0100170 | A1 * | 5/2004 | Brown | E05D 15/58 | 312/322 |
| 2004/0100171 | A1 * | 5/2004 | Brown | E06B 3/5045 | 312/322 |
| 2004/0252045 | A1 * | 12/2004 | Wu | E05D 15/58 | 341/176 |
| 2006/0090295 | A1 * | 5/2006 | Hofer | E05D 5/065 | 16/237 |
| 2007/0159037 | A1 * | 7/2007 | Hoffman | E05D 15/58 | 312/322 |
| 2010/0270898 | A1 * | 10/2010 | Haab | E05D 15/58 | 312/323 |
| 2013/0232878 | A1 * | 9/2013 | Bortoluzzi | E05D 15/58 | 49/252 |
| 2015/0008811 | A1 * | 1/2015 | Ishii | E06B 3/5045 | 312/322 |
| 2017/0241178 | A1 * | 8/2017 | Gabl | E05F 1/16 | |
| 2020/0157867 | A1 * | 5/2020 | Girotto | E05D 15/58 | |
| 2021/0246699 | A1 | 8/2021 | Göetz | | |

FOREIGN PATENT DOCUMENTS

| | | |
|---|---|---|
| CN | 104080992 | 10/2014 |
| DE | 39 42 584 | 6/1991 |
| DE | 297 10 854 | 10/1997 |
| DE | 298 09 193 | 10/1998 |
| FR | 2 511 236 | 2/1983 |
| JP | 61-69381 | 5/1986 |
| JP | 6-37480 | 5/1994 |
| JP | 6-212854 | 8/1994 |
| KR | 20-0359026 | 8/2004 |
| TW | 202026513 | 7/2020 |

* cited by examiner

ASSEMBLY FOR GUIDING A MOVABLE FURNITURE PART

BACKGROUND OF THE INVENTION

The invention relates to an assembly for guiding a movable furniture part, preferably a sliding door or folding sliding door, on a stationary furniture part, preferably a furniture carcass. Furthermore, the invention relates to a piece of furniture with such an assembly.

Assemblies of this general type are already known. A disadvantage with such solutions according to the state of the art is that the movable furniture part is only guided via the support on the at least one guide system. A movement of the support—and thus also of the movable furniture part—along the at least one guide system can be hindered or blocked by the movable furniture part because of the inadequate guiding of the movable furniture part. It is also possible that the movable and/or the stationary furniture part is or are damaged by such a movement.

SUMMARY OF THE INVENTION

The object of the present invention is to avoid the described disadvantages according to the state of the art and to specify an assembly, which is improved compared with the state of the art, for guiding a movable furniture part, preferably a sliding door or folding sliding door, on a stationary furniture part, preferably a furniture carcass, and a piece of furniture with at least one such assembly.

According to the invention, the movable furniture part has a guide device, which is separate from the at least one guide system, for directly guiding the movable furniture part on the stationary furniture part.

The movable furniture part is thus guided on the stationary furniture part not only indirectly via the support, but also directly via the separate guide device. During a movement of the support—and thus also of the movable furniture part—along the at least one guide system, the movable furniture part is thereby guided such that a frictionless course of movement is ensured.

The assembly comprises at least one adjusting device, by which at least one part of the guide device is adjustable relative to the stationary furniture part, preferably in a direction normal to a longitudinal extent of the at least one guide system.

Such an adjusting device makes an, above all also later, adjustment of the guide device to given or changing framework conditions possible. In particular, the guide device can be adjusted by the adjusting device such that the movable furniture part is guided parallel to the at least one guide system during a movement of the support—and thus also of the movable furniture part—along the at least one guide system.

Furthermore, a piece of furniture according to the invention with at least one stationary furniture part, at least one movable furniture part and at least one assembly for guiding the movable furniture part on the stationary furniture part is provided, preferably wherein the piece of furniture comprises a shaft-like cavity, in which the at least one movable furniture part can be arranged.

The guide device can comprise at least one groove and at least one guide element engaging in areas in the at least one groove. This represents an uncomplicated and cost-effective yet at the same time stable possibility for implementing a guide device.

In an embodiment of the invention, the at least one groove is arranged on the movable furniture part, preferably wherein the at least one groove extends over the entire length of an edge of the movable furniture part and that the at least one guide element is arranged on the stationary furniture part.

However, the at least one groove can also be arranged on the stationary furniture part and that the least one guide element is arranged on the movable furniture part, preferably wherein the at least one guide element extends over the entire length of an edge of the movable furniture part.

Depending on the specific application case, at least one of the two variants ensures an optimal guiding of the movable furniture part on the stationary furniture part.

If the at least one groove or the at least one guide element extends over the entire length of an edge of the movable furniture part, this contributes to an even more stable and more comprehensive guiding of the movable furniture part on the stationary furniture part.

According to a further embodiment of the invention, the movable furniture part is formed by a sliding door or folding sliding door, preferably wherein the sliding door or folding sliding door comprises only one door leaf.

Furthermore, the adjusting device can have an actuating element, by which the adjusting device is actuatable, preferably wherein the actuating element is implemented in the form of a screw. This represents a simple possibility for actuating the adjusting device.

Preferably, the assembly has a compensation device.

Particularly preferably, the compensation device comprises a pivot lever mechanism and/or a cable pull device.

Such a compensation device prevents a jamming of the support on the at least one guide system, if an overload occurs on the movable furniture part.

If the assembly comprises at least two guide systems, preferably vertically spaced apart from one another, then a more stable guiding of the support on the guide systems is guaranteed.

In relation to a piece of furniture according to the invention, the movable furniture part comprises a frame, preferably consisting of an aluminum profile, and/or a cover, preferably made of glass.

Such a formation of the movable furniture part makes a stable construction of the movable furniture part possible. In the event that the movable furniture part consists of an aluminum frame and a glass cover, then this is additionally visually appealing for users.

Particularly preferably, the profile has the groove and/or the guide element. This is a cost-effective, uncomplicated and visually appealing possibility for implementing a part of the guide device.

BRIEF DESCRIPTION OF THE DRAWINGS

Further details and advantages of the invention are explained in more detail below by means of the description of the invention with reference to the drawings, in which.

DETAILED DESCRIPTION OF THE INVENTION

Figure 1A:
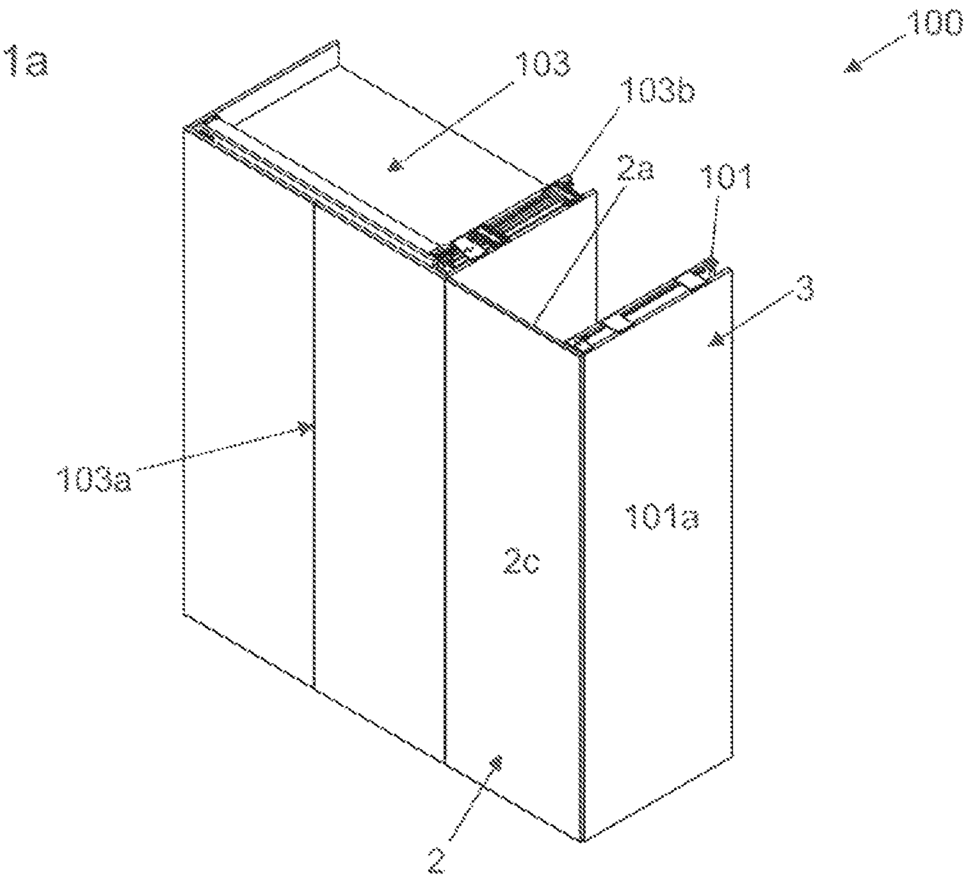
FIG. 1*a* shows a piece of furniture with an assembly according to the invention in a perspective view.

A piece of furniture 100 with an assembly according to the invention in a perspective view can be seen in FIG. 1. The piece of furniture 100 comprises a stationary furniture part 3 and a movable furniture part 2 in the form of a folding sliding door with one door leaf. In the present embodiment, the door leaf is formed of a frame 2*b*, not visible, consisting of aluminum profiles as well as a cover 2*c* made of glass.

Of course, various materials can be used for frame and cover, for example wood, plastic or different metals. It can also be provided that frame and cover consist of the same material or even that frame and cover are formed in one part with each other.

The stationary furniture part 3 further has a cavity 101, which is delimited by side walls 101*a*. The movable furniture part 2 can be inserted into the cavity 101 at least in areas.

In the present example, a piece of furniture 100 according to the invention has further furniture sections 103 with a folding sliding door 103*a* and a cavity 103*b*. These furniture sections 103 can be either ordinary furniture sections or furniture sections with assemblies according to the invention.

Figure 1B:
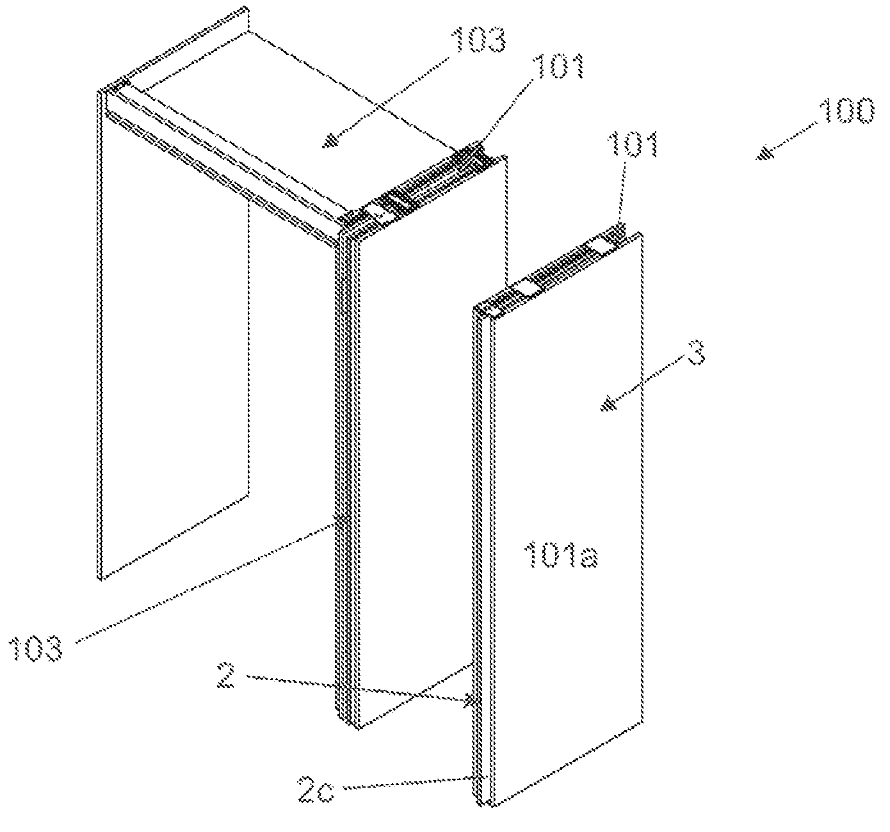
FIG. 1*b* shows a piece of furniture with an assembly according to the invention in a perspective view in an opened state.

In FIG. 1*b* it can be seen that the movable furniture part 2 has been opened and transferred into the cavity 101. The folding sliding door 103*a* of the further furniture section 103 is also opened and transferred into the cavity 103*b*.

Figure 2A:
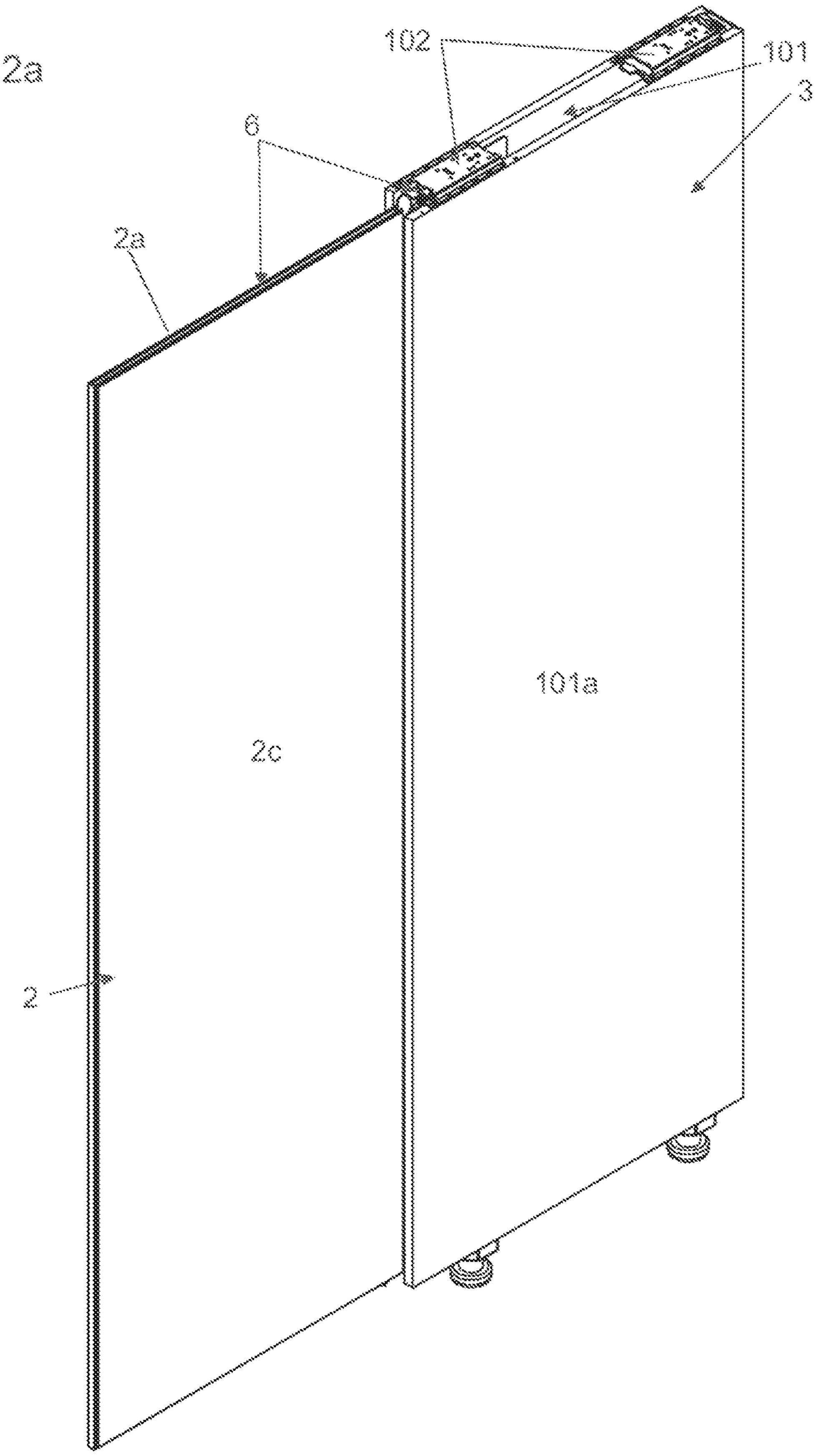
FIG. 2*a* is a perspective view of a part of a piece of furniture according to the invention.

FIG. 2*a* shows a perspective view of a part of a piece of furniture 100 according to the invention. It can be seen that the side walls 101*a* delimiting the cavity 101 are connected to one another via connecting elements 102. A guide device 6 is hinted at.

Figure 2B:
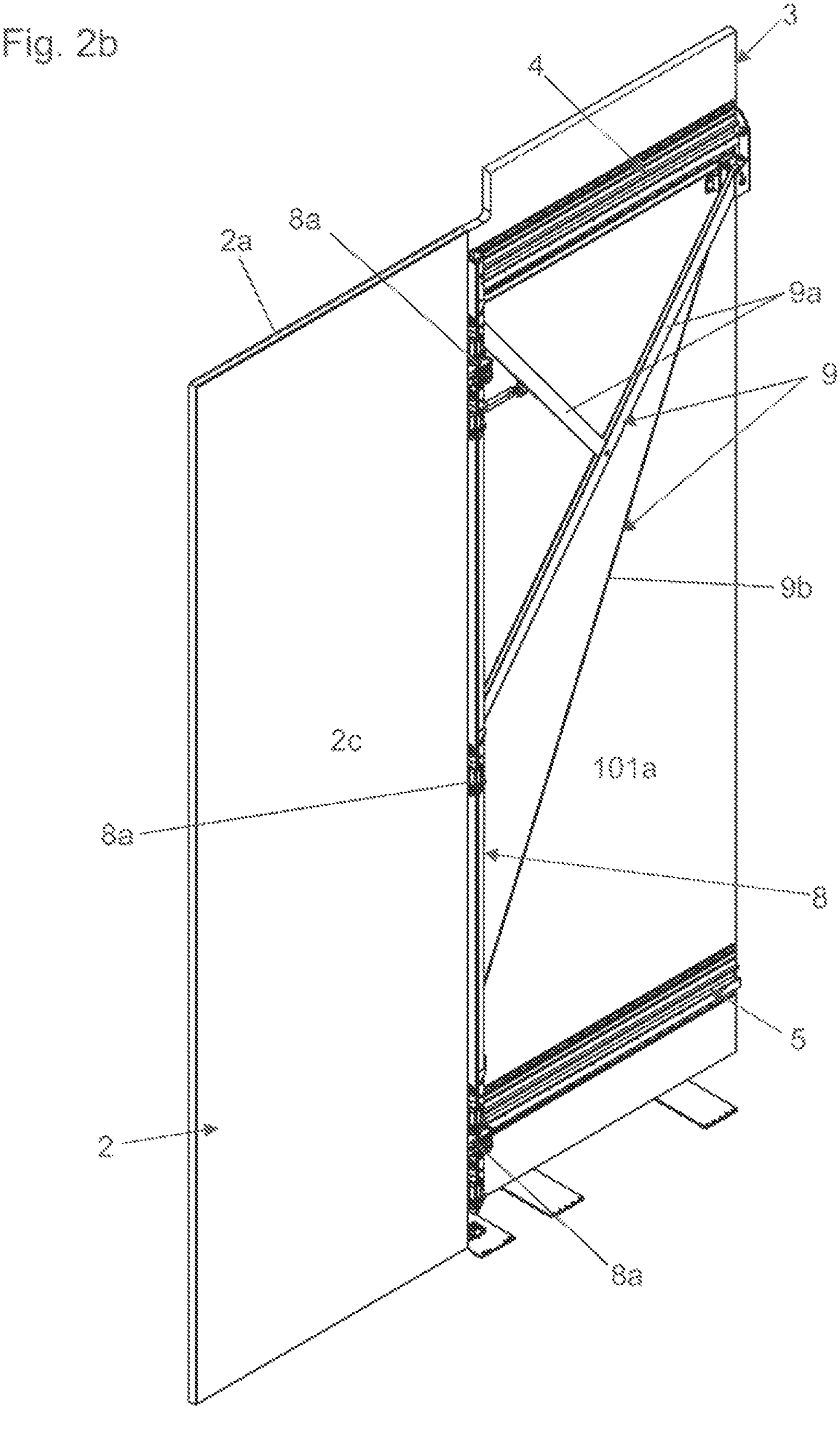
FIG. 2*b* is a perspective view of a part of a piece of furniture according to the invention without a side wall.

FIG. 2*b* again shows a perspective view of a part of a piece of furniture 100 according to the invention, but without a side wall 101*a*. Two guide systems 4, 5 for guiding the support 8 on the stationary furniture part 3 can be seen. A movable furniture part 2 is mounted pivotable on the support 8 via hinges 8*a*.

Further, a compensation device 9, consisting of a pivot lever mechanism 9*a* and a cable pull device 9*b*, can be seen. The pivot lever mechanism 9*a* comprises two pivot levers, wherein the longer of the two pivot levers is arranged on the one hand pivotable on the stationary furniture part and on the other hand pivotable and displaceable substantially centrally on the support. The shorter of the two pivot levers is mounted pivotable in an upper area of the support and substantially centrally on the longer pivot lever.

The cable pull device 9*b* comprises a cable, which is arranged with its ends in each case on the support. The cable is connected to the stationary furniture part via guide pulleys.

Figure 3A:
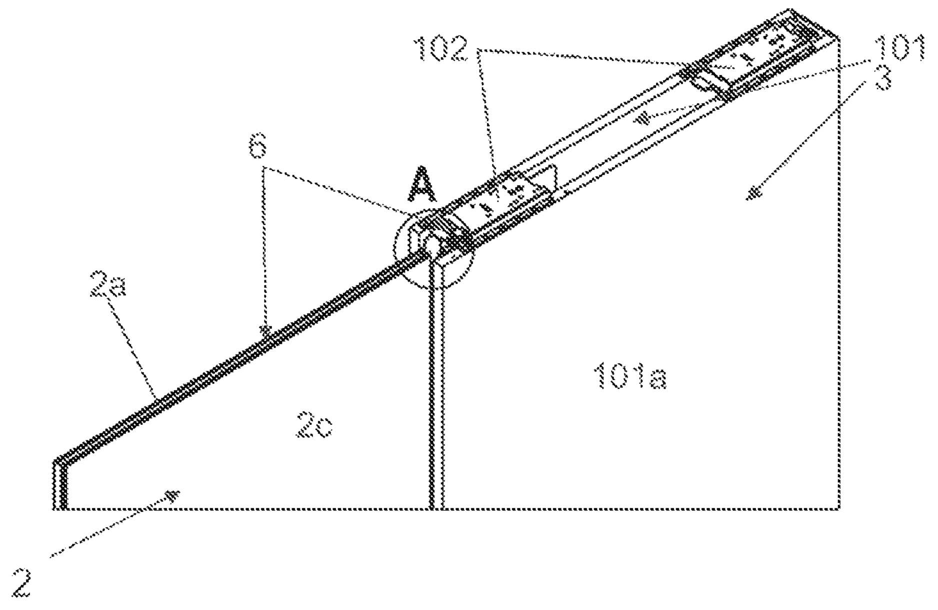
FIG. 3*a* is a section of a perspective view of a part of a piece of furniture according to the invention in a first position.
Figure 3B:
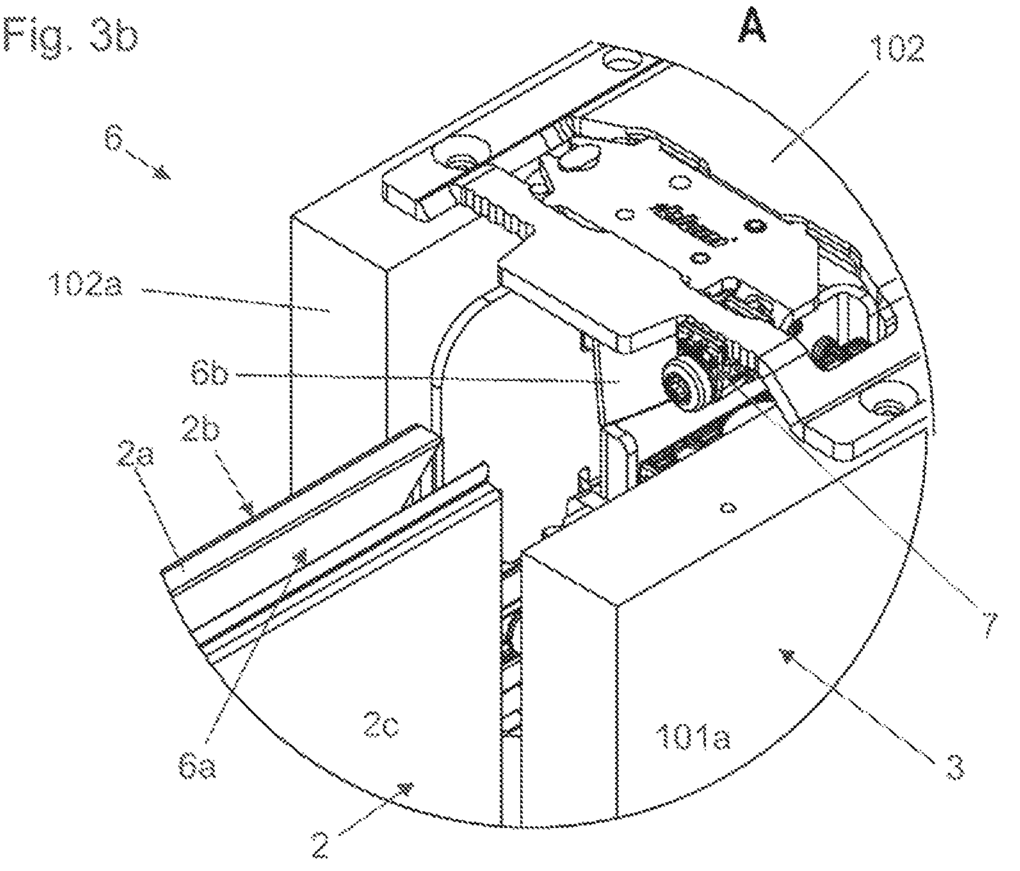
FIG. 3*b* shows detail A of FIG. 3*a*.

FIG. 3*a* shows a section of a perspective view of a part of a piece of furniture 100 according to the invention in a first position. It can be seen that the movable furniture part 2 is not yet arranged in the cavity 101. Detail A of FIG. 3*a* is represented in FIG. 3*b*.

It is evident that the frame 2*b* has the groove 6*a* of the guide device 6. In this embodiment, the groove 6*a* extends along an entire edge 2*a* of the frame 2*b*. In particular, the groove 6*a* is formed by the frame 2*b*.

However, it can also be provided that the groove 6*a* extends only in areas along the edge 2*a*. Moreover, the groove 6*a* can also be formed for example by a profile separate from the frame 2*b*.

Further, a connecting element 102, which connects the side walls 101*a*, is evident. In the present embodiment, the adjusting device 7 is arranged on the connecting element 102. A guide element 6*b* arranged on the adjusting device 7 can be adjusted via the setting device 7. In particular, the adjustment of the guide element 6*b* is effected along a normal to the side walls 101*a*. The guide element 6*b* is not yet in engagement with the groove 6*a*.

It can also be provided that the movable furniture part 2 or the frame 2*b* can be adjusted by the adjusting device 7 via the guide element 6*b* and the groove 6*a*. Further, it is conceivable that the adjusting device 7 is arranged not on the connecting element 102 but rather on the stationary furniture part 3 for example via a separate fastening device.

Figure 4A:
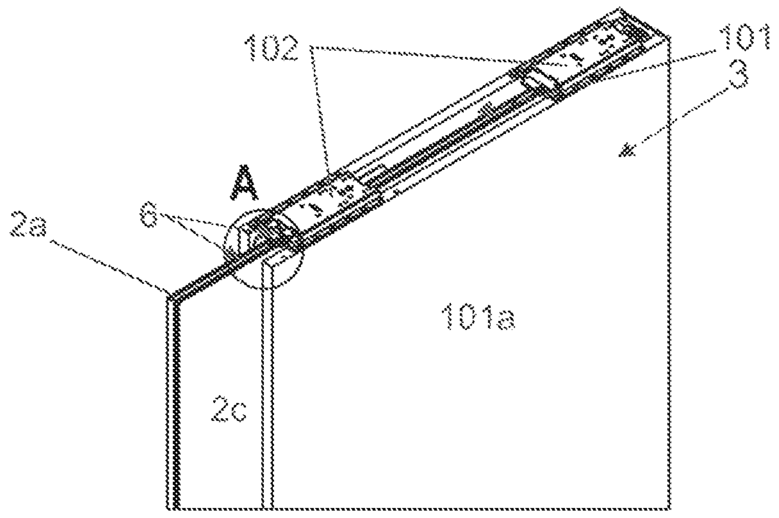
FIG. 4*a* is a section of a perspective view of a part of a piece of furniture according to the invention in a second position.
Figure 4B:
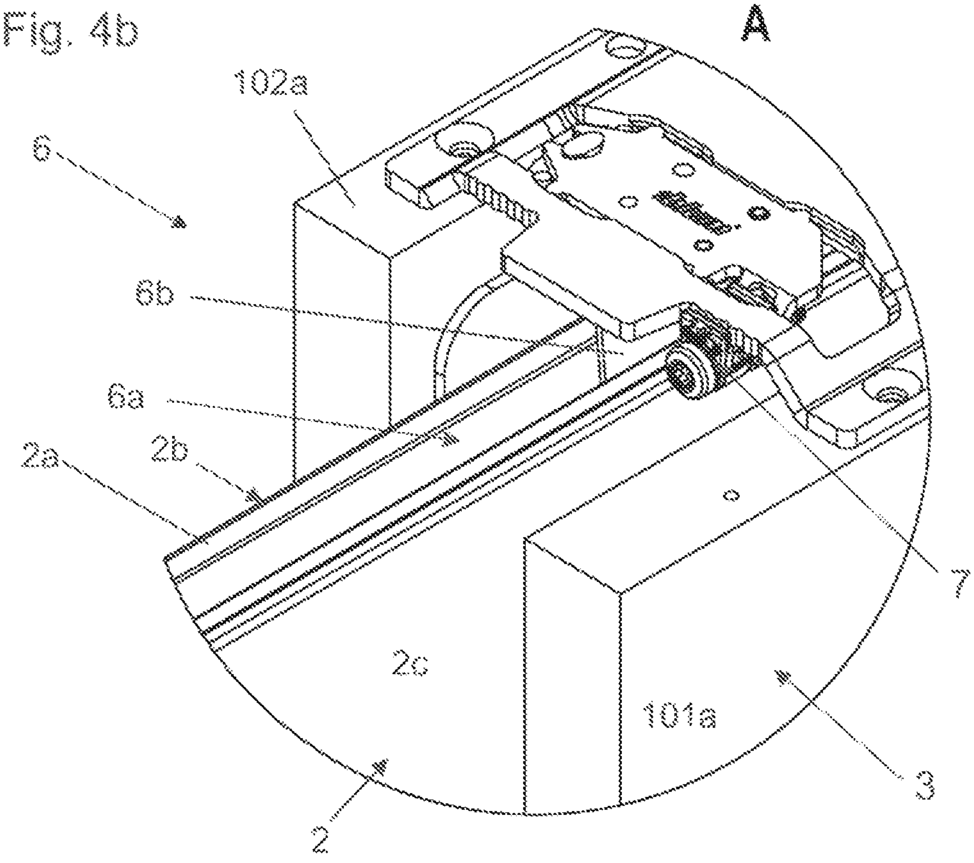
FIG. 4*b* shows detail A of FIG. 4*a*.

FIG. 4*a* shows a section of a perspective view of a part of a piece of furniture 100 according to the invention in a first position. It can be seen that the movable furniture part 2 is arranged in areas in the cavity 101. Detail A of FIG. 4*a* is represented in FIG. 4*b*. It can be seen that the guide element 6*b* is now in engagement with the groove 6*a*, whereby the movable furniture part 2 is guided directly on the stationary furniture part 3.

Figure 5A:
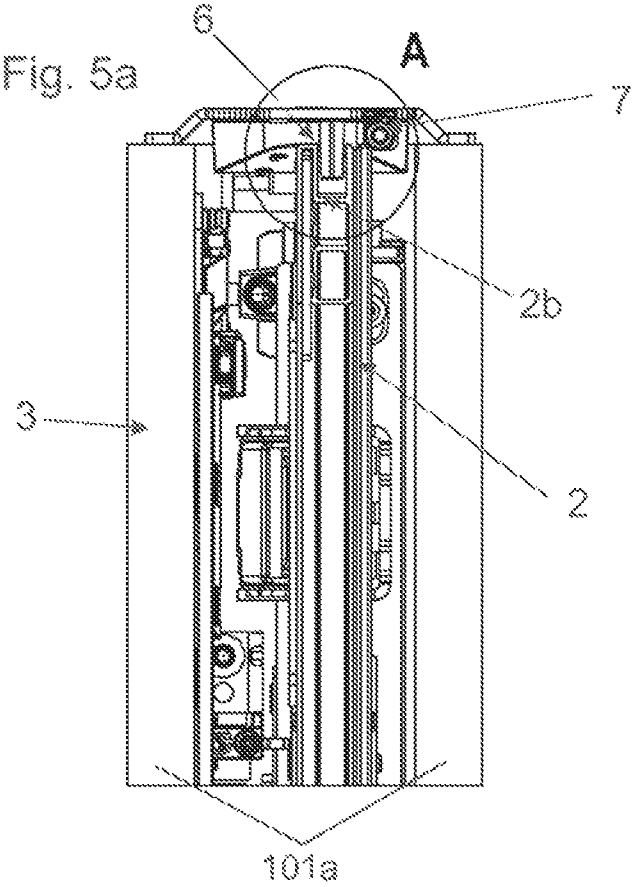
FIG. 5*a* is a section of a front view of a part of a piece of furniture according to the invention.
Figure 5B:
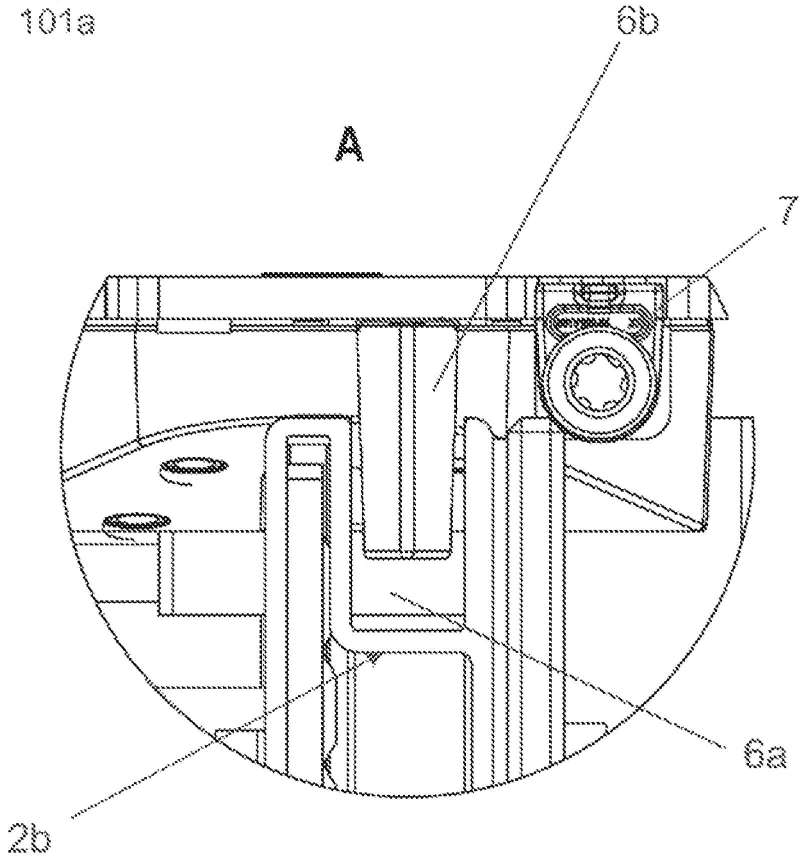
FIG. 5*b* shows detail A of FIG. 5*a*.

For better understanding, FIG. 5*a* shows a section of a front view of a part of a piece of furniture 100 according to the invention. FIG. 5*b* again shows detail A from FIG. 5*a*.

It can be seen that the guide element 6*b* is in engagement with the groove 6*a* and thus the movable furniture part 2 is guided directly on the stationary furniture part 2. It also follows from these FIGS. 5*a* and 5*b* that an adjustment of the guide element 6*b* via the adjusting device 7 also results in an adjustment of the position of the movable furniture part 2 in the cavity 101, thus between the side walls 101*a*. The adjusting device 7 can thus be inserted in order to orient the movable furniture part 2 inside the cavity 101.

FIGS. 6*a* to 9*b* show different embodiments for frames 2*b* according to the invention, wherein FIGS. 6*a*, 7*a*, 8*a* and 9*a* show a perspective view of the frames 2*b* and FIGS. 6*b*, 7*b*, 8*b* and 9*b* show an associated sectional representation in each case.

Figure 6A:
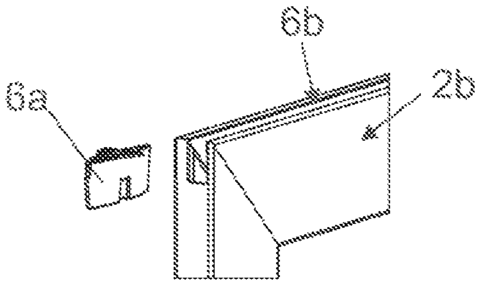
FIG. 6*a* shows a section of a first embodiment of a movable furniture part according to the invention.
Figure 6B:
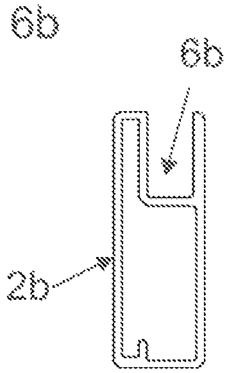
FIG. 6*b* shows a cross section of a frame of a first embodiment of a movable furniture part according to the invention.

In the first embodiment according to FIGS. 6*a* and 6*b* the frame 2*b* has the groove 6*a*. Frame 2*b* and groove 6*a* are formed integral with one other. The frame 2*b* is formed of profiles, for example extruded profiles.

Figure 7A:
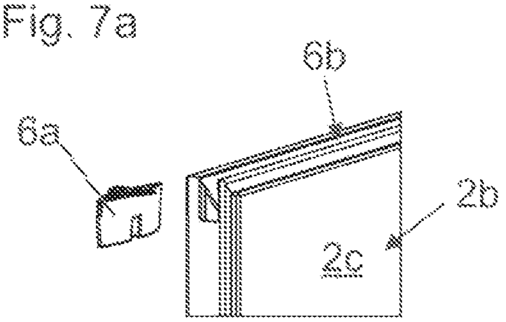
FIG. 7*a* is a section of a second embodiment of a movable furniture part according to the invention.
Figure 7B:
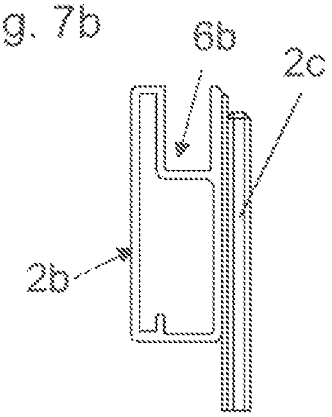
FIG. 7*b* shows a cross section of a frame of a second embodiment of a movable furniture part according to the invention.

The second embodiment according to FIGS. 7*a* and 7*b* correspond substantially to the first, but a cover 2*c*, for example made of glass, is additionally arranged on the frame 2*b*.

Figure 8A:
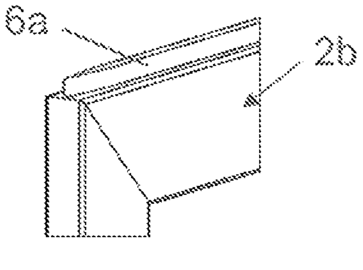
FIG. 8*a* shows a section of a third embodiment of a movable furniture part according to the invention.
Figure 8B:
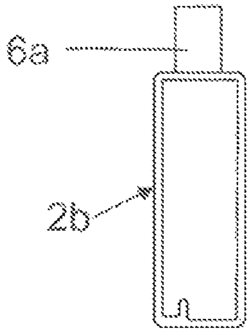
FIG. 8*b* shows a cross section of a frame of a third embodiment of a movable furniture part according to the invention.

In the third embodiment according to FIGS. 8*a* and 8*b*, the frame 2*b* has the guide element 6*b*. Frame 2*b* and guide element 6*b* can be formed integral with one other. However, the guide element 6*b* can also be formed by a separate part, for example made of plastic.

Figure 9A:
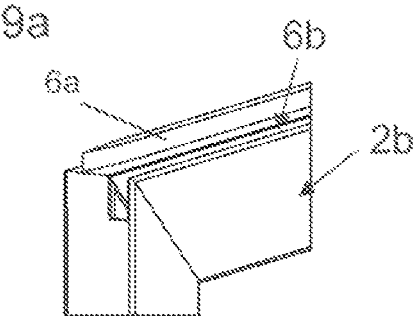
FIG. 9*a* shows a section of a fourth embodiment of a movable furniture part according to the invention.
Figure 9B:
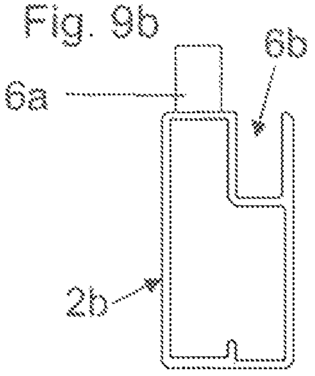
FIG. 9*b* shows a cross section of a frame of a fourth embodiment of a movable furniture part according to the invention.

The fourth embodiment according to FIGS. 9*a* and 9*b* is a combination of the embodiments one and three. The frame 2*b* therefore has both a groove 6*a* and a guide element 6*b*.

Figure 10:
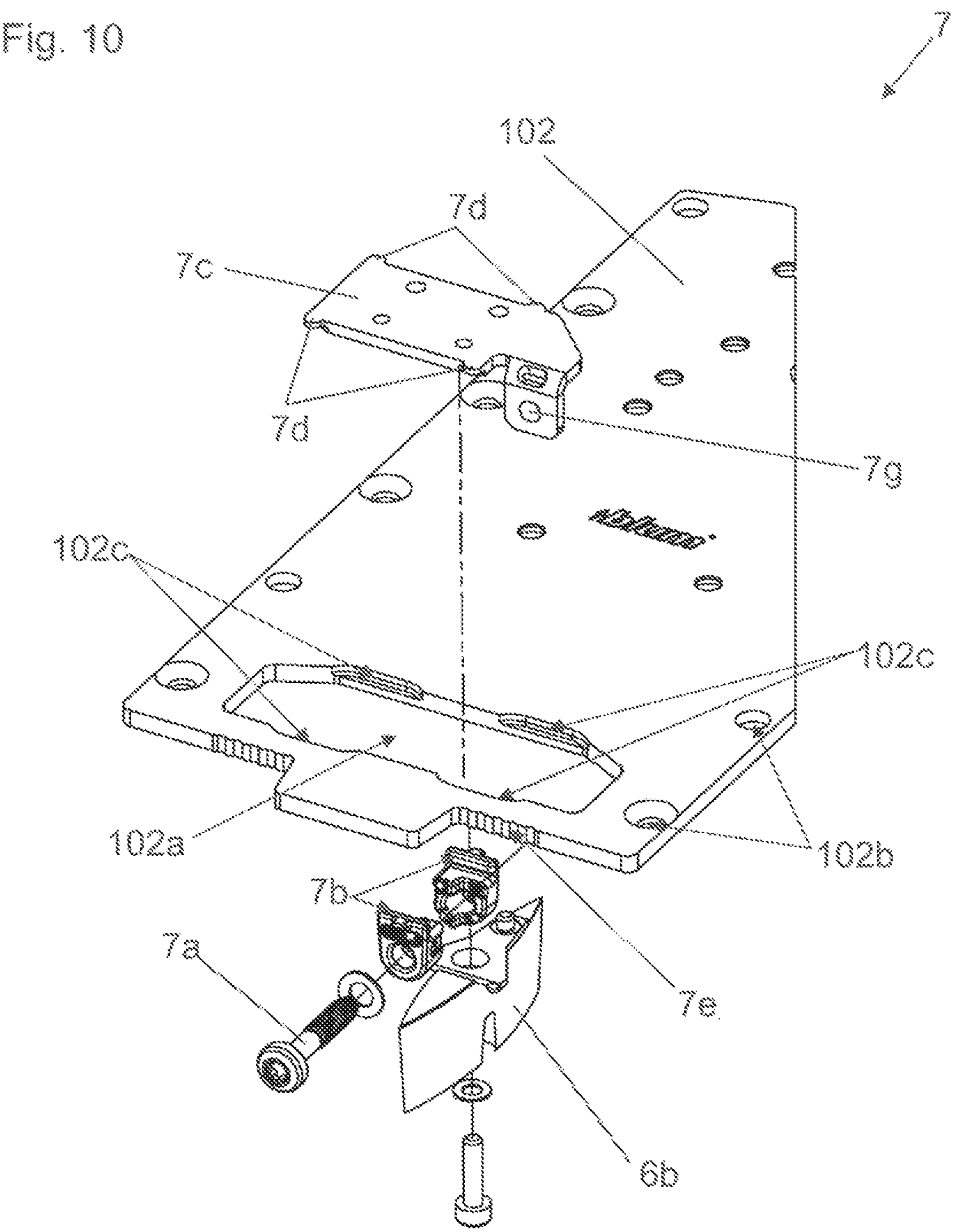
FIG. 10 is an exploded representation of an adjusting device according to the invention.

FIG. 10 shows an exploded representation of an adjusting device according to the invention. The adjusting device 7 has a mounting device 7*c*, which, in the present embodiment, is arranged displaceable in a recess 102*a* of a connecting element 102. The guide element 6*b* is mounted on the mounting device 7*c*. It can also be provided that the groove 6*a* is mounted on the mounting device 7*c*.

The mounting device 7*c* has protrusions 7*d*, which engage in depressions 102*c* of the connecting element 102. Thereby, the mounting device 7*c* on the one hand is held in the connecting element 102 and on the other hand limits a movement of the mounting device 7*c*.

The adjusting device 7 further has an actuating element 7*a*. The actuating element 7*a* is connected to fixing elements 7*b* and a receiver 7*f* on the mounting device 7*c*. Through actuation of the actuating device 7*a*, the fixing elements 7*b* are clamped in a clamping area 7*e*. Since the actuating element 7*a* is also connected to the mounting device 7*c*, the mounting device is thus fixed with respect to the connecting element 102. As a result, the guide element 6*b* is also fixed with respect to the stationary furniture part 3.

To adjust the guide element 6*b* with respect to the stationary furniture part 3, the actuating element 7*a* is actuated, whereby the clamping via the fixing elements 7*b* on the clamping area 7*e* is released. The mounting device 7*c* and thus the guide element 6*b* can now be adjusted. After the adjustment process the mounting device 7*c* and thus the guide element 6*b* can be fixed as already described.

The drilled holes 102*b* in the connecting element 102 serve for fastening the connecting element 102 to the stationary furniture part 2 or to the side walls 101*a*.

Figure 11A:
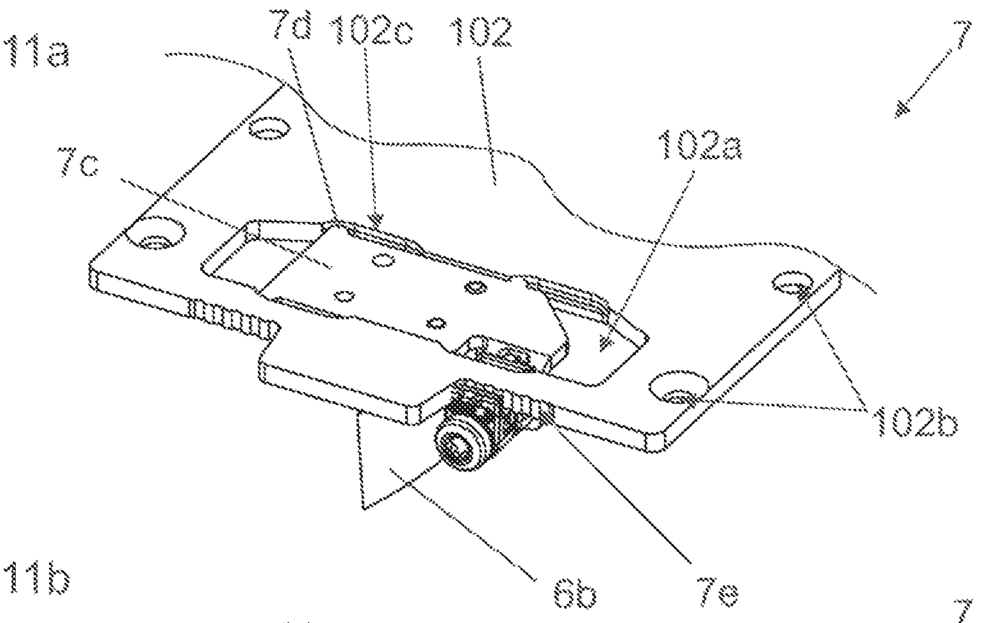
FIG. 11*a* shows an adjusting device according to the invention in a first position.
Figure 11B:
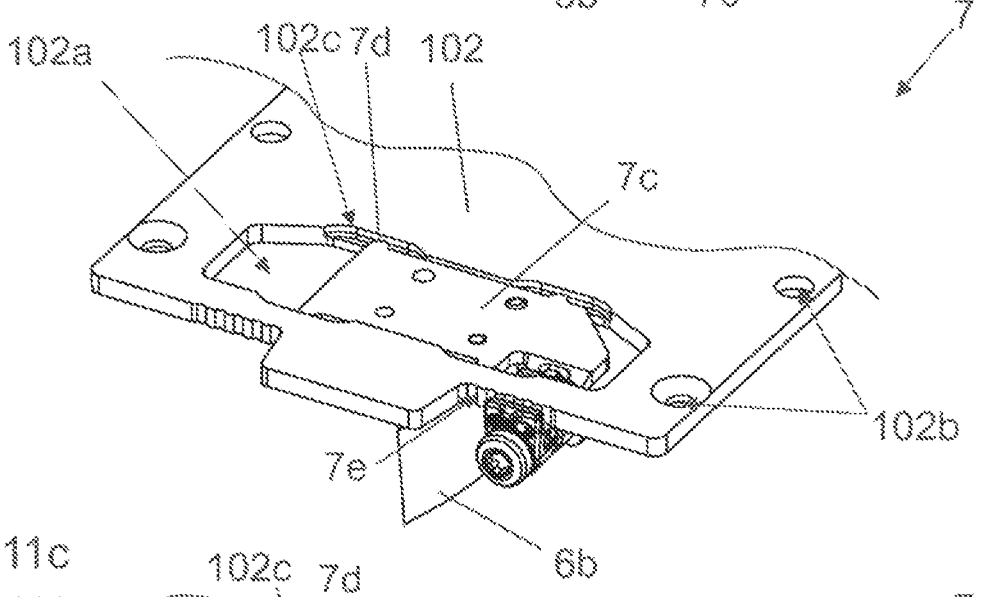
FIG. 11*b* shows an adjusting device according to the invention in a second position.
Figure 11C:
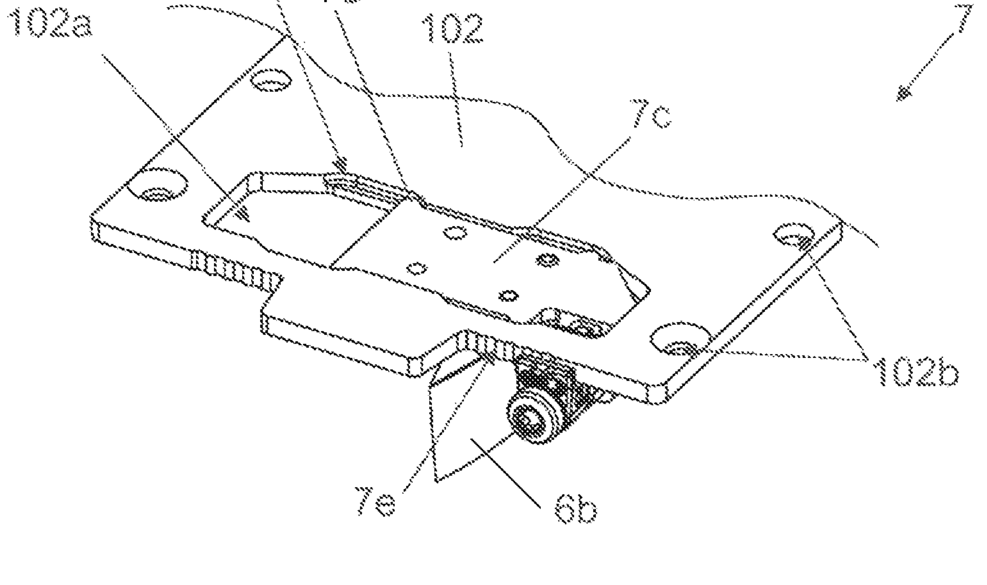
FIG. 11*c* shows an adjusting device according to the invention in a third position.

FIGS. 11*a* to 11*b* show an adjusting device 7 according to the invention in different positions. In FIG. 11*a* the adjusting device is maximally adjusted in a first direction, in FIG. 11*b* the adjusting device is arranged in a middle position and in FIG. 11*c* the adjusting device is maximally adjusted in a second direction. It can be seen how the guide element 6*b* is adjusted relative to the connecting element 102 and thus to the stationary furniture part 3.

LIST OF REFERENCE NUMBERS

1 assembly
2 movable furniture part
2*a* edge
2*b* door profile/frame
2*c* cover element
3 stationary furniture part
4 guide system
5 guide system
6 guide device
6*a* groove
6*b* guide element
7 adjusting device
7*a* actuating element
7*b* fixing element
7*c* mounting device
7*d* protrusion
7*e* clamping area
7*f* receiver
8 support
8*a* hinges
9 compensation device
9*a* pivot lever mechanism
9*b* cable pull device
100 piece of furniture
101 cavity
101*a* side wall
102 connecting element
102*a* recess
102*b* drilled hole
102*c* depression
103 further furniture section
103*a* folding sliding door
103*b* cavity

The invention claimed is:

1. An assembly for guiding a movable furniture part on a stationary furniture part, comprising:

a first guide system to be fastened to the stationary furniture part; and a support on which the movable furniture part is mounted so as to be pivotable, the support being connected movably to the first guide system for indirectly engaging the movable furniture part so as to guide the movable furniture part on the stationary furniture part, wherein the movable furniture part has a guide device, which is separate from the first guide system, for directly engaging the movable furniture part so as to guide the movable furniture part on the stationary furniture part, wherein the assembly further comprises an adjusting device configured to be actuated in a direction parallel to a longitudinal extent of the first guide system, and by means of which at least one part of the guide device is adjustable relative to the stationary furniture part in a direction perpendicular to the longitudinal extent of the first guide system, wherein the guide device comprises a groove and a guide element which engages with the groove, and wherein the groove is arranged on the movable furniture part and the guide element is configured to be arranged on the stationary furniture part.

2. The assembly according to claim 1, wherein the adjusting device has an actuating element by which the adjusting device is actuatable.

3. The assembly according to claim 2, wherein the actuating element, by which the adjusting device is actuatable, is in the form of a screw.

4. The assembly according to claim 1, wherein the adjusting device has a mounting device on which at least one part of the guide device is mounted.

5. The assembly according to claim 4, wherein the mounting device is movably mounted in a recess of a connecting element.

6. The assembly according to claim 5, wherein the connecting element is arranged on the stationary furniture part.

7. The assembly according to claim 1, wherein the assembly has a compensation device.

8. The assembly according to claim 7, wherein the compensation device comprises a pivot lever mechanism or a cable pull device.

9. The assembly according to claim 1, further comprising a second guide system.

10. A piece of furniture comprising:

a stationary furniture part; and the assembly according to claim 1, wherein the assembly is configured to guide the movable furniture part on the stationary furniture part.

11. The piece of furniture according to claim 10, wherein the piece of furniture comprises a shaft-like cavity, wherein the shaft-like cavity is formed by at least two side walls which are connected to one another via at least one connecting element, wherein at least one part of the guide device is arranged or formed on or in the at least one connecting element.

12. The piece of furniture according to claim 11, wherein the at least two side walls are parallel to each other.

13. The piece of furniture according to claim 10, wherein the movable furniture part is formed by a sliding door or folding sliding door.

14. The piece of furniture according to claim 13, wherein the movable furniture part is formed by the sliding door, and the sliding door comprises only one door leaf.

15. The piece of furniture according to claim 10, wherein the movable furniture part comprises a frame or a cover.

16. The piece of furniture according to claim 15, wherein the movable furniture part comprises the frame, and the frame comprises an aluminum profile, and wherein the aluminum profile has the groove or the guide element.

17. The piece of furniture according to claim 16, wherein the groove or the guide element is formed integrally with the aluminum profile.

18. The piece of furniture according to claim 15, wherein the movable furniture part comprises the frame, and the frame comprises an aluminum profile, or the movable furniture part comprises the cover, and the cover is made of glass.

19. The piece of furniture according to claim 10, wherein the piece of furniture comprises a shaft-like cavity in which the movable furniture part can be arranged.

20. The assembly according to claim 1, wherein the movable furniture part is a sliding door or folding sliding door, and the stationary furniture part is a furniture carcass, wherein the groove extends over an entire length of an edge of the movable furniture part.

21. The assembly according to claim 1, wherein the first and second guide systems are vertically spaced apart from each other.

* * * * *